(12) United States Patent
Koike

(10) Patent No.: US 12,147,215 B2
(45) Date of Patent: Nov. 19, 2024

(54) CONTROL DEVICE

(71) Applicant: FANUC CORPORATION, Yamanashi (JP)

(72) Inventor: Masataka Koike, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 124 days.

(21) Appl. No.: 17/923,075

(22) PCT Filed: May 21, 2021

(86) PCT No.: PCT/JP2021/019375
§ 371 (c)(1),
(2) Date: Nov. 3, 2022

(87) PCT Pub. No.: WO2021/241440
PCT Pub. Date: Dec. 2, 2021

(65) Prior Publication Data
US 2023/0161323 A1    May 25, 2023

(30) Foreign Application Priority Data
May 28, 2020 (JP) .................... 2020-093395

(51) Int. Cl.
*G05B 19/41* (2006.01)
*G05B 19/414* (2006.01)

(52) U.S. Cl.
CPC ............ *G05B 19/4141* (2013.01); *G05B 2219/33119* (2013.01)

(58) Field of Classification Search
CPC .............. G05B 19/414; G05B 19/4141; G05B 2219/33119
See application file for complete search history.

(56) References Cited

U.S. PATENT DOCUMENTS 6,809,493 B2 * 10/2004 Iwashita .............. G05B 19/416
                                                        318/625
7,558,646 B2 *  7/2009 Matsumoto ............ B25J 9/1682
                                                        700/229

(Continued)

FOREIGN PATENT DOCUMENTS

CN         101334766    12/2008
JP         2003-241804   8/2003

(Continued)

OTHER PUBLICATIONS

International Search Report issued Aug. 3, 2021 in corresponding International Application No. PCT/JP2021/019375.

*Primary Examiner* — Rina I Duda
(74) *Attorney, Agent, or Firm* — Wenderoth, Lind & Ponack, L.L.P.

(57) ABSTRACT

A control device comprises a plurality of command application units, a plurality of platform units, and a shared memory. The command application units are each provided with a command mediation method designation unit that outputs, to the platform unit, identification information pertaining to a platform unit to be subject to cooperative control and a mediation method classification. The platform units are each provided with: an inter-platform communication unit that transmits a command value, the identification information, and the mediation method classification between the platform units via the shared memory; and a command mediation unit that acquires the command value, the identification information, and the mediation method classification from all platform units to be subject to cooperative control, mediates the command values on the basis of the identification information and the mediation method classification, and outputs the mediated command values to the shared memory.

2 Claims, 11 Drawing Sheets

(56) References Cited

U.S. PATENT DOCUMENTS

| | | | | |
|---|---|---|---|---|
| 8,436,565 B2* | 5/2013 | Maeda | ............... | G05B 19/404 |
| | | | | 318/632 |
| 9,904,278 B2* | 2/2018 | Ogino | ............... | G05B 19/4141 |
| 10,126,734 B2* | 11/2018 | Sonoda | ............... | G05B 19/416 |
| 2019/0101881 A1* | 4/2019 | Shimamura | ............ | G05B 19/05 |
| 2019/0101893 A1* | 4/2019 | Oya | ...................... | B25J 9/1671 |

FOREIGN PATENT DOCUMENTS

| | | |
|---|---|---|
| JP | 2004-220326 | 8/2004 |
| JP | 2005-316880 | 11/2005 |
| JP | 2019-67045 | 4/2019 |
| JP | 2019-67046 | 4/2019 |

\* cited by examiner

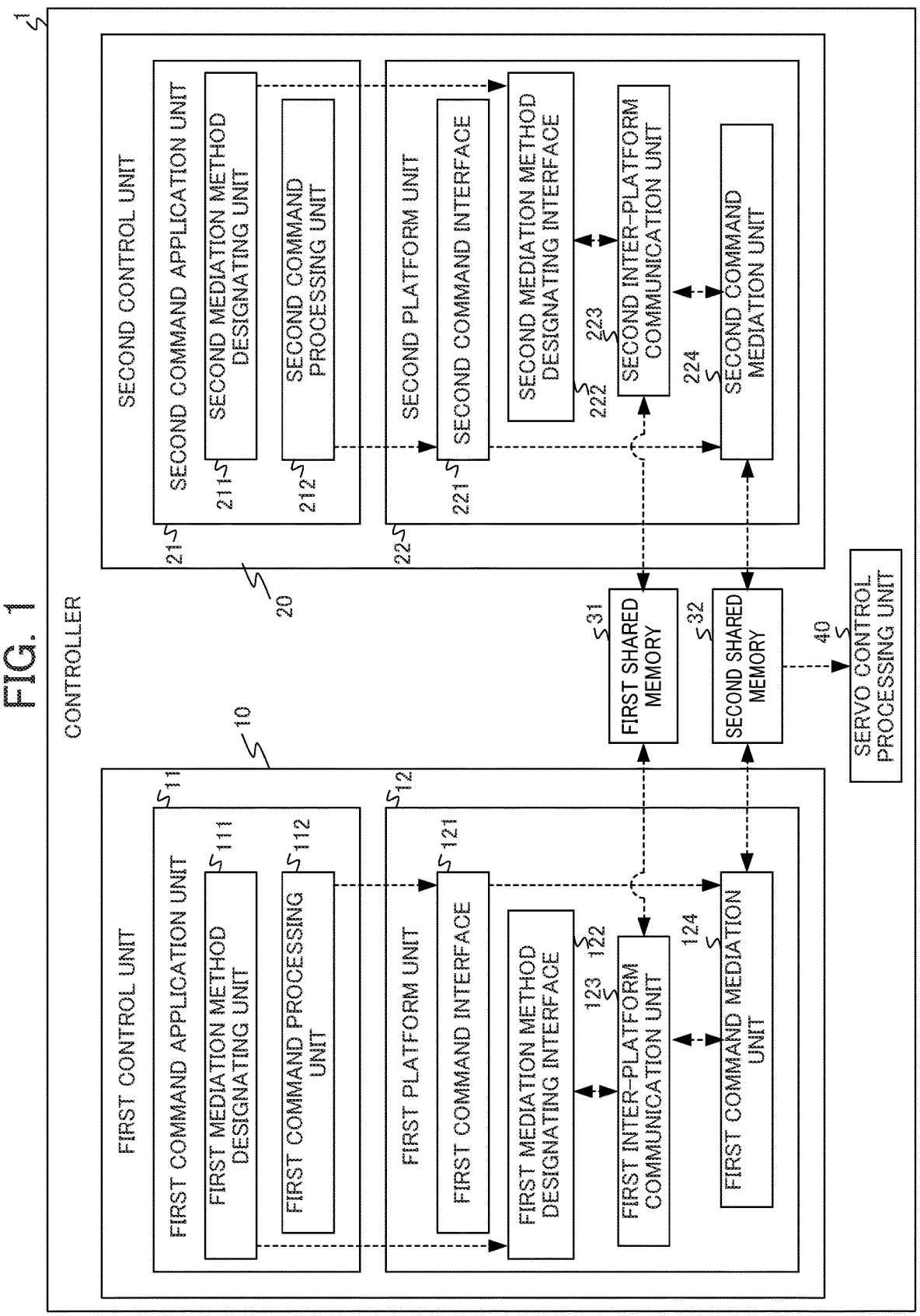

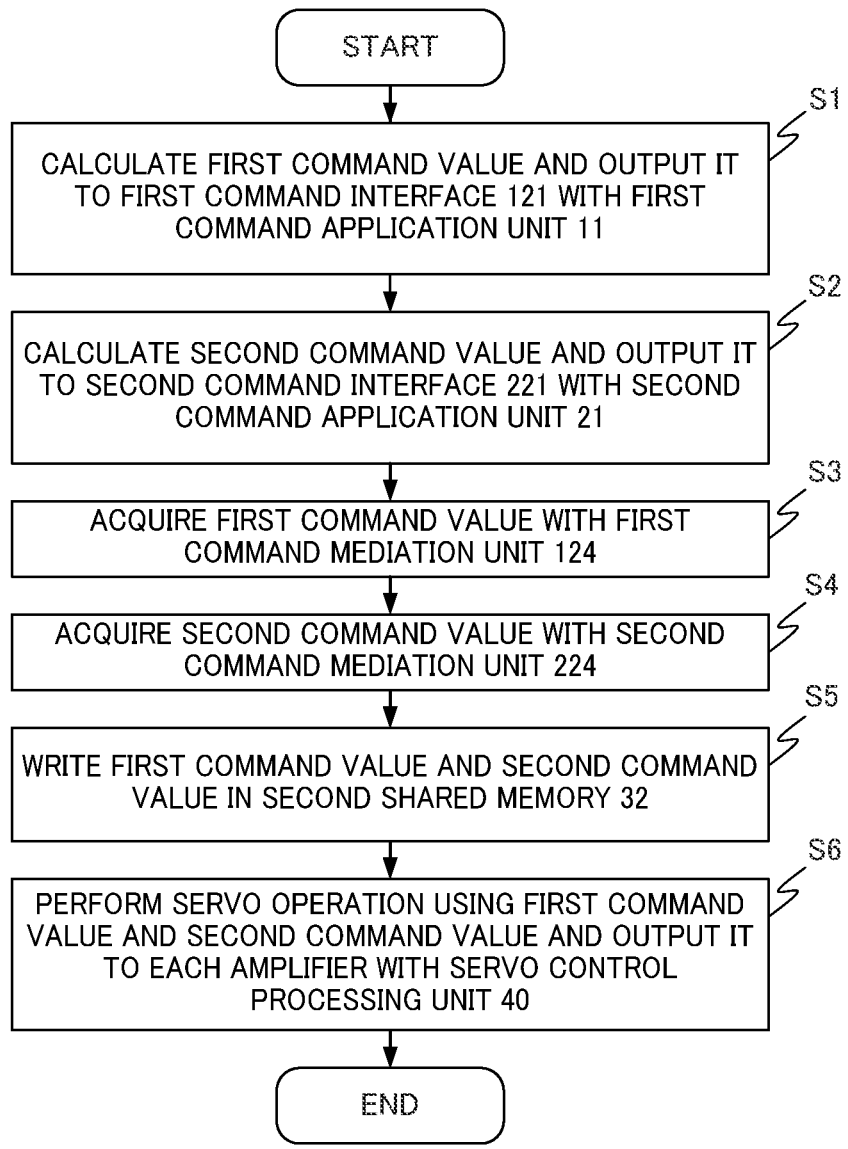

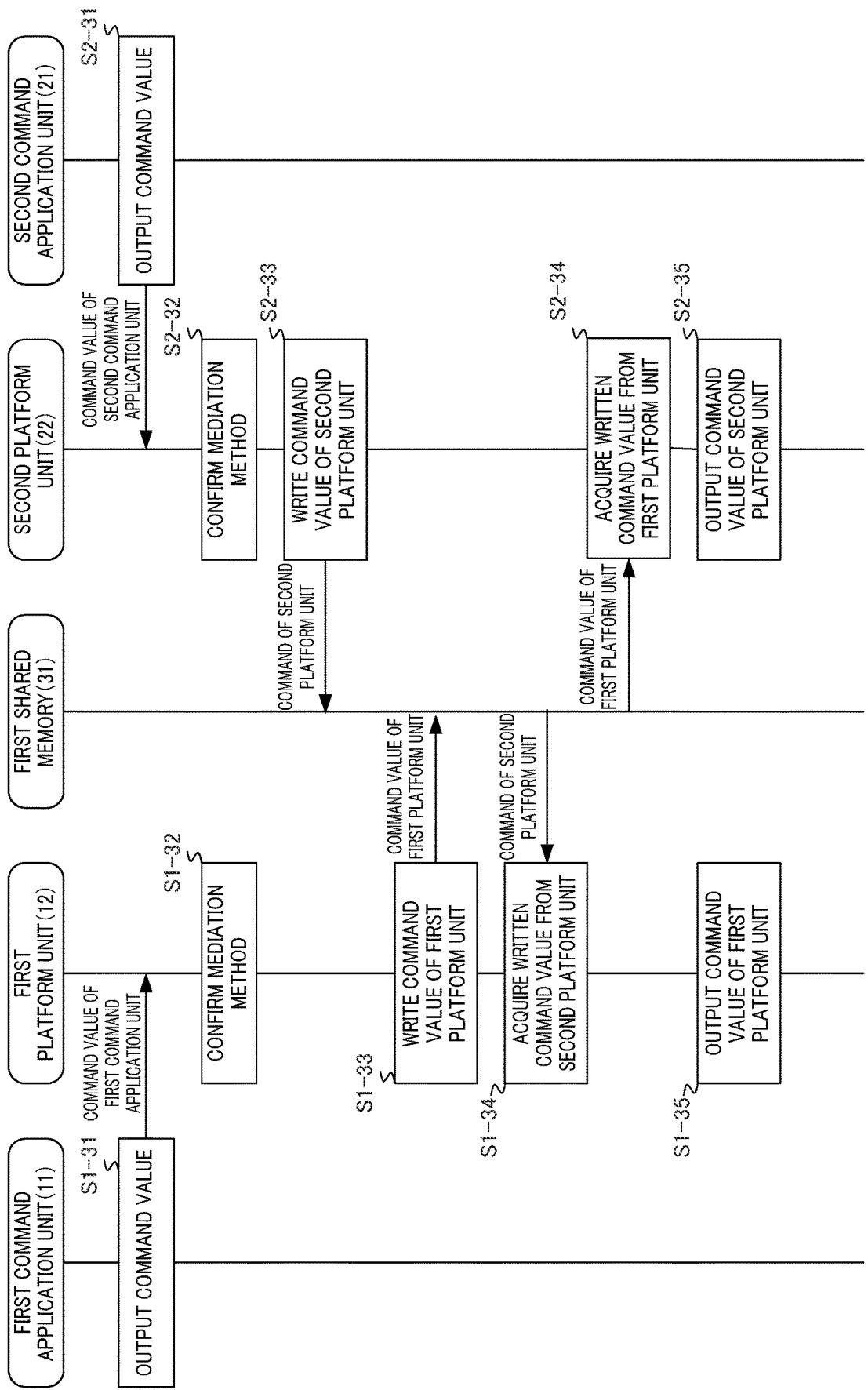

CONTROL DEVICE

TECHNICAL FIELD

The present invention relates to a controller.

BACKGROUND ART

In manufacturing factories, a case is increasing in which a conveyor, a robot, a machining device, and the like are used in one production line. At present, in the conveyor and the like, which perform simple operations, commands are often given using a ladder, a function block, a structured text language (ST language), and the like on a PLC (Programmable Louie Controller). In the robot, commands are given by a robot program on a robot controller. On the other hand, in the machining device such as a machine tool, commands are given by a G code on a controller.

In such a case, a plurality of different controllers and a plurality of command languages are used in one production line. In a production line where the plurality of different controllers are used in one production line, an operation timing is adjusted between devices in an operation such as waiting for an operation of another device and performing the next operation by, for example, an application using a distributed control platform provided in each controller (for example, see Japanese Unexamined Patent Application, Publication No. 2004-220326).

Patent Document 1: Japanese Unexamined Patent Application, Publication No. 2004-220326

DISCLOSURE OF THE INVENTION

Problems to be Solved by the Invention

For this reason, a line designer should calculate a command for coordinated operation between devices on the application of each controller, and is forced to perform a complicated design. Further, it takes time to confirm the operation between the devices in switching the operation between the devices, and it is difficult to perform a smooth coordinated operation.

There is a demand for a technique that enables an application in each controller to operate a device to be controlled without being conscious of the operation timing.

Means for Solving the Problems

An aspect of the present disclosure provides a controller including a plurality of platforms, the controller including: a plurality of command application units; a plurality of platform units that are associated with the plurality of command application units, respectively; a shared memory that stores information communicated between the plurality of platforms; and a servo control processing unit, the command application units including: a command processing unit that outputs a command value; and a command mediation method designating unit that outputs a mediation method classification and identification information of the platform units subject to coordinated control, the platform units including: a first interface unit that acquires the command value from the command application units; a second interface unit that acquires the mediation method classification and the identification information of the platform units from the command application units; an inter-platform communication unit that transfers the command value, the identification information, and the mediation method classification between the platform units via the shared memory; and a command mediation unit that acquires the command value, the identification information, and the mediation method classification from all the platform units subject to coordinated control, mediates the command value based on the identification information and the mediation method classification, and outputs the mediated command value to the shared memory, the servo control processing unit being configured to perform servo control based on the mediated command value acquired from the shared memory.

Effects of the Invention

According to the present invention, the application in each controller can cause the to-be-controlled device to operate without being conscious of the operation timing.

BRIEF DESCRIPTION OF THE DRAWINGS

FIG. 1 is a functional block diagram of a controller according to an embodiment;

FIG. 2A is a flowchart showing an operation of the controller according to the embodiment;

FIG. 10 is a sequence diagram showing an operation of the controller according to the embodiment.

PREFERRED MODE FOR CARRYING OUT THE INVENTION

Figure 2B:
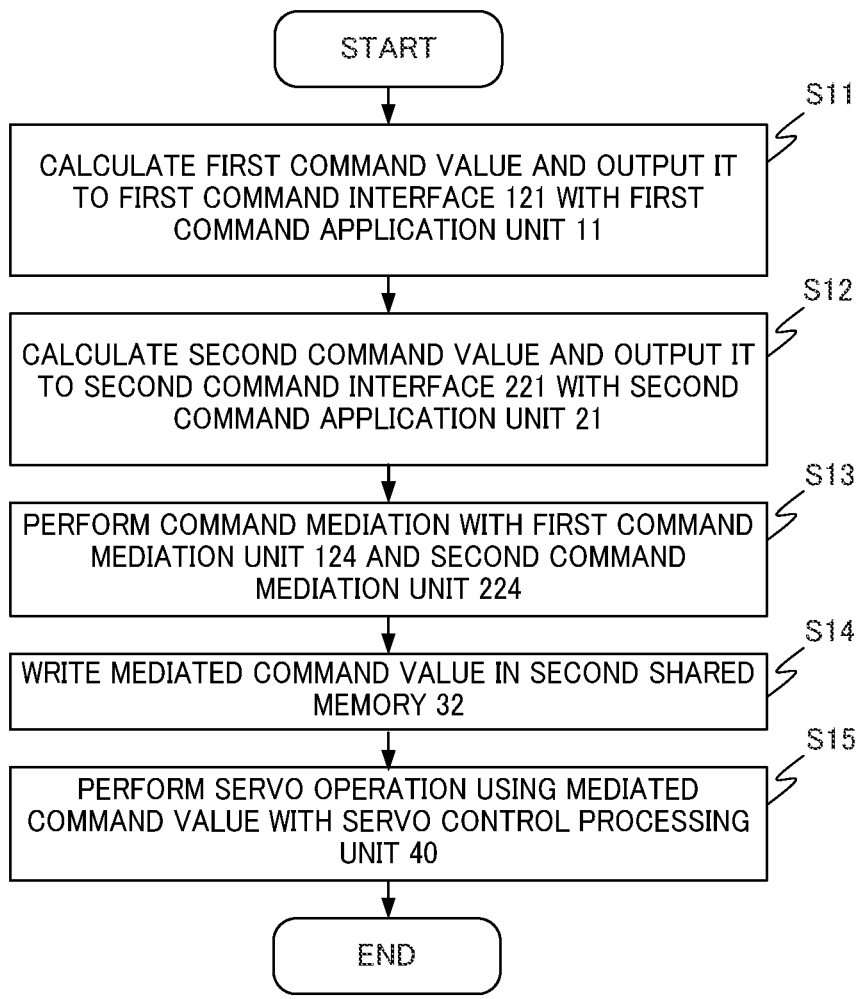
FIG. 2B is a flowchart showing an operation of the controller according to the embodiment.

Hereinafter, an embodiment of the present invention will be described with reference to FIGS. 1 to 7.

1. Constitution of Embodiment

FIG. 1 is a functional block diagram showing a constitution of a controller 1 according to the present embodiment. The controller 1 includes a first control unit 10, a second control unit 20, a first shared memory 31, a second shared memory 32, and a servo control processing unit 40. Although a controller including two control units is illustrated as an example, the number of control units is not limited to two. The controller 1 may include three or more control units. For example, when three or more control units are provided, each of the control units includes a functional unit equivalent to a functional unit provided in the first control unit 10 or the second control unit 20. Specifically, when three control units are provided, a third control unit (referred to as "third control unit") includes a third command application unit and a third platform unit. Further, when four control units are provided, a fourth control unit (referred to as "fourth control unit") includes a fourth command application unit and a fourth platform unit. Although a case is illustrated in the present embodiment in which two control units are provided, even when three or more control units are provided, each control unit similarly constituted.

The first control unit 10 and the second control unit 20 are control units that control devices different from each other, respectively. Here, examples of the "devices different from each other" include conveyors, robots, machine tools, machining devices, and press machines. The controller 1 controls devices different from each other in a coordination manner by the first control unit 10 and the second control unit 20. The first control unit 10 and the second control unit 20 are constituted a CPU, for example.

The first control unit 10 includes a first command application unit 11 and a first platform unit 12.

The first command application unit 11 outputs, to the first platform unit 12, a command process including a command value for a device controlled by the first control unit 10, and a mediation method of mediating between this command process and a command process from the second control unit 20 for a device controlled by the second control unit 20.

The first command application unit 11 includes a first mediation method designating unit 111 and a first command processing unit 112.

The first mediation method designating unit 111 negotiates a command mediation method between a plurality of other platforms based on coordinated control information set in advance by a user. Here, the term "coordinated control information" means, for example, identification information on all platforms subject to coordinated control and a mediation method. Further, the term "mediation method" specifically includes any one of sequence control, synchronization, mixing, and superimposition, and includes a method of calculating a command value. Specifically, the term "sequence control" means a process of controlling a sequence of commands executed by each platform. The term "synchronization" means a process of synchronizing commands executed by each platform. The term "mixing" means a process of outputting a command of the first platform from the second platform while outputting a command of the second platform from the first platform. The term "superimposition" means a process of adding the command values used in each platform on one platform.

The first mediation method designating unit 111 outputs, to a first mediation method designating interface (to be described below) in the first platform unit 12, identification information on all platforms subject to coordinated control and a classification of mediation method.

The first command processing unit 112 outputs, to the first platform unit 12, a command value for driving the device controlled by the first control unit 10. More specifically, the first command processing unit 112 outputs the above-described command value to a first command interface 121 (to be described below) in the first platform unit 12.

The first platform unit 12 includes a first command interface 121, a first mediation method designating interface 122, a first inter-platform communication unit 123, and a first command mediation unit 124.

The first command interface 121 is an interface used to deliver the command value acquired from the first command application unit 11 to the first command mediation unit 124.

The first mediation method designating interface 122 is an interface used to deliver the mediation method classification and the identification information on all the platforms subject to coordinated control, which are acquired from the first command application unit 11, to the first inter-platform communication unit 123. Further, the first mediation method designating interface 122 transmits and receives information related to the mediation method classification and the mediation method of the command value to/from the inter-platform communication unit of all the platform subject to coordinated control via the first inter-platform communication unit 123.

The first inter-platform communication unit 123 outputs, to the first command mediation unit 124, the platform identification information, the mediation method classification with the platform, the command value, and the information related to the mediation method of the command value, which are received from all the platforms subject to coordinated control. Further, the first inter-platform communication unit writes the platform identification information of the first platform unit 12 itself, the mediation method classification with the platform, the command value acquired via the first command mediation unit 124 (to be described below) from the first command application unit 11, and the information related to the mediation method of the command value in the first shared memory 31 in order to output them to another platform subject to coordinated control.

Upon acquiring a command value from the first command processing unit 112 via the first command interface 121, the first command mediation unit 124 outputs the command value to the first inter-platform communication unit 123. Further, the first command mediation unit 124 mediates the command value based on the mediation method classification and the platform identification information on all the platforms subject to coordinated control which are acquired from the first inter-platform communication unit 123, and writes the mediated command value to the second shared memory 32.

The second control unit 20 includes a second command application unit 21 and a second platform unit 22.

Since the second command application unit 21 has the same function as the first command application unit 11, detailed description thereof will not be given. Further, since the second platform unit 22 has the same function as the first platform unit 12, detailed description thereof will not be given.

The second command application unit 21 includes a second mediation method designating unit 211 and a second command processing unit 212. Since the second mediation method designating unit 211 has the same function as the first mediation method designating unit 111, detailed description thereof will not be given. Since the second command processing unit 212 has the same function as the first command processing unit 112, detailed description thereof will not be given.

The second platform unit 22 includes a second command interface 221, a second mediation method designating interface 222, a second inter-platform communication unit 223, and a second command mediation unit 224.

Since the second command interface 221 has the same function as the first command interface 121, detailed description thereof will not be given. Since the second mediation method designating interface 222 has the same function as the first mediation method designating interface 122, detailed description thereof will not be given. Since the second inter-platform communication unit 223 has the same function as the first inter-platform communication unit 123, detailed description thereof will not be given. Since the second command mediation unit 224 has the same function as the first command mediation unit 124, detailed description thereof will not be given.

The first shared memory 31 is a memory in which the first inter-platform communication unit 123 and the second inter-platform communication unit 223 write the respective platform identification information, the mediation method classification between platforms, the command value, and the information related to the mediation method of the command value.

The second shared memory 32 is a memory in which the first command mediation unit 124 and the second command mediation unit 224 each write the command value mediated based on the platform identification information on all the platforms subject to coordinated control and the mediation method classification, which are acquired from the respective inter-platform communication units via the first shared memory 31.

The first shared memory 31 and the second shared memory 32 may be collectively referred to as "shared memory".

The servo control processing unit 40 performs servo control based on the mediated command value written in the second shared memory 32.

With such a constitution, the controller 1 can perform mediation (coordinated operation) or commands executed by different applications for different devices, which require a coordinated operation, with the first platform unit 12 and the second platform unit 22 without using, the first command application unit 11 and the second command application unit 21.

2. Operation of Embodiment

An operation of the controller 1 according to the present embodiment will be described below with reference to FIGS. 2A and 2B. FIG. 2A is a flowchart showing a basic operation of the controller 1. FIG. 2B is a flowchart showing an operation of the controller 1 at the time of mediation.

2.1. Basic Operation

First, a flow of commands in the basic operation of the controller 1 will be described with reference to FIG. 2A. Here, the term "basic operation" means an operation in which the first command value output from the first command application unit 11 and the second command value output from the second command application unit 21 are not mediated and both command values are output to the servo control processing unit 40 as they are. For simplification of the description, it is assumed that whether both the command values are not mediated is confirmed before the first command value and the second command value are processed.

In Step S1, the first command processing unit 112 in the first command application unit 11 calculates the first command value using a motion program of a certain execution format, and outputs the command value to the first command interface 121 of the first platform unit 12.

In Step S2, the second command processing unit 212 in the second command application unit 21 calculates the second command value using a motion program of a certain execution format, and outputs the second command value to the second command interface 221 of the second platform unit 22.

In Step S3, the first command mediation unit 124 acquires the first command value from the first command interface 121.

In Step S4, the second command mediation unit 224 acquires the second command value from the second command interface 221.

In Step S5, the first command mediation unit 124 and the second command mediation unit 224 write the first command value and the second command value the second shared memory 32, respectively.

In Step S6, the first command value and the second command value written in the second shared memory 32 are acquired by the servo control processing unit 40, and the servo control processing unit 40 performs calculation for servo control using the command values. The servo control processing unit 40 outputs such a calculation result to each amplifier, thereby driving each motor.

2.2 Operation During Mediation

The operation of the controller 1 at the time of mediation will be described below with reference to FIG. 2B. At the time of mediation, the controller 1 mediates the above-described "first command value" and "second command value", and outputs the mediated command value to the servo control processing unit 40. For simplification of the description, it is assumed that the mediation method related to both the command values is confirmed before the first command value and the second command value are processed. Note that the mediation method related to both the command values may be confirmed in the course of processing the first command value and the second command value.

Since processing of Steps S11 and S12 is the same as the processing of Steps S1 and S2, the description thereof will not be given.

In Step S13, the first command mediation unit 124 of the first platform unit 12 and the second command mediation unit 224 of the second platform unit 22 mediate the first command value and the second command value, respectively, via the first inter-platform communication unit 123, the second inter-platform communication unit 223, and the first shared memory 31 according to the designated mediation method.

In Step S14, the first command mediation unit 124 or the second command mediation unit 224 writes the mediated command value in the second shared memory 32.

In Step S15, each of the mediated command values written in the second shared memory 32 by the first command mediation unit 124 or the second command mediation unit 224 is acquired by the servo control processing unit 40, and the servo control processing unit 40 performs calculation for servo control using the command value. The servo control processing unit 40 outputs such a calculation result to each amplifier, thereby driving each motor.

3. Examples

3.1 First Example

Hereinafter, first example will be described with reference to FIGS. 3 to 5. The first example is an example in which one controller performs superimposed control between devices having different execution formats (that is, superimposed control in which a value obtained by adding the "second command value" to the "first command value" described above is set as the "first command value").

Figure 3:
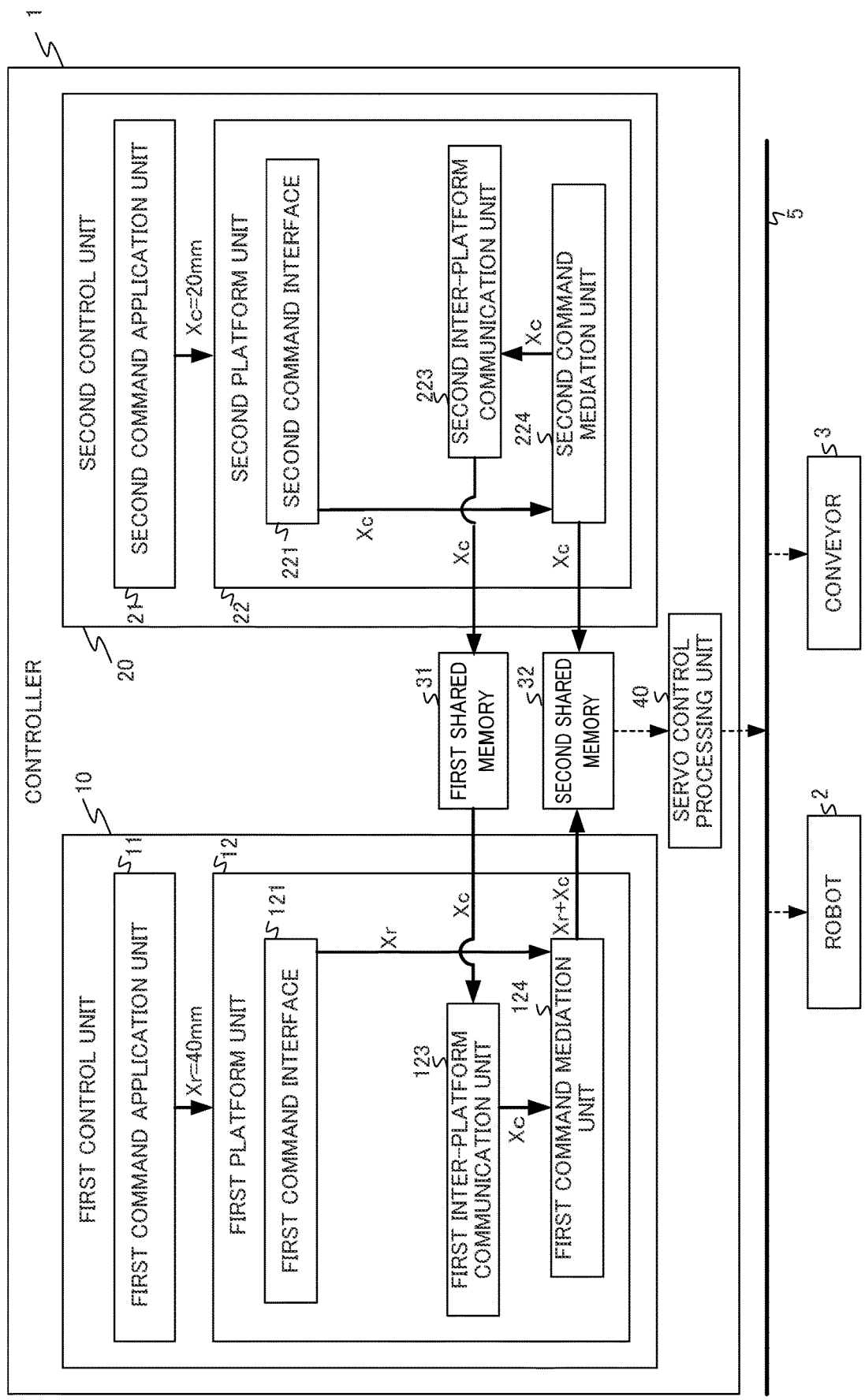
FIG. 3 is a diagram showing a flow of information in the controller according to the embodiment.

FIG. 3 is a diagram showing a flow of information related to the command value in the controller 1 according to the present example. In FIG. 3, some components of the constitution of the controller 1 shown in FIG. 1 will not be provided for simplification of the description.

Figure 4:
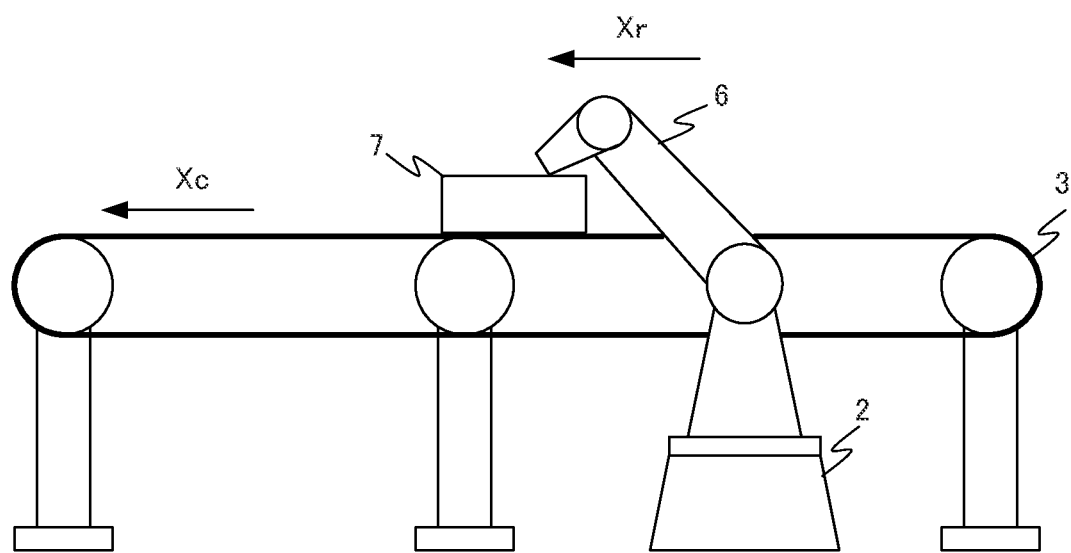
FIG. 4 is a diagram showing an example of a system controlled by the controller according to the embodiment.

Further, FIG. 4 is an overall configuration diagram illustrating a system that executes superimposed control belonging to the present example. In the present example, as illustrated in FIG. 4, a robot 2 uses an arm 6 to move a workpiece 7 on a conveyor 3. At this time, in order to improve productivity, a moving distance (corresponding to the second command value) of the conveyor 3 is superimposed on a motion distance (corresponding to the first command value) of the arm 6 in the robot 2.

In FIG. 3, the command values are transferred along arrows indicated by solid lines. In the example shown in FIG. 3, the controller 1 controls the robot 2 and the conveyor 3 via a bus 5. More specifically, the first control unit 10 controls the robot 2, and the second control unit 20 controls the conveyor 3. Further, the first command application unit 11 is a robot controller that controls the robot 2 using a robot program as an example. The second command application unit 21 is a software PLC that controls the conveyor 3 using an ST language as an example.

The first command application unit 11 outputs, to the first platform unit 12, a motion distance Xr (=40 mm) of the arm 6 of the robot 2 as a command value. Further, the second command application unit 21 outputs, to the second platform unit 22, a moving distance Xc (=20 mm) of the conveyor 3 as a command value. At this time, the first platform unit 12 superimposes the command values Xr and Xc, and writes the superimposed command values in the second shared memory 32. The command values written in the second shared memory 32 are acquired by the servo control processing unit 40.

Figure 5:
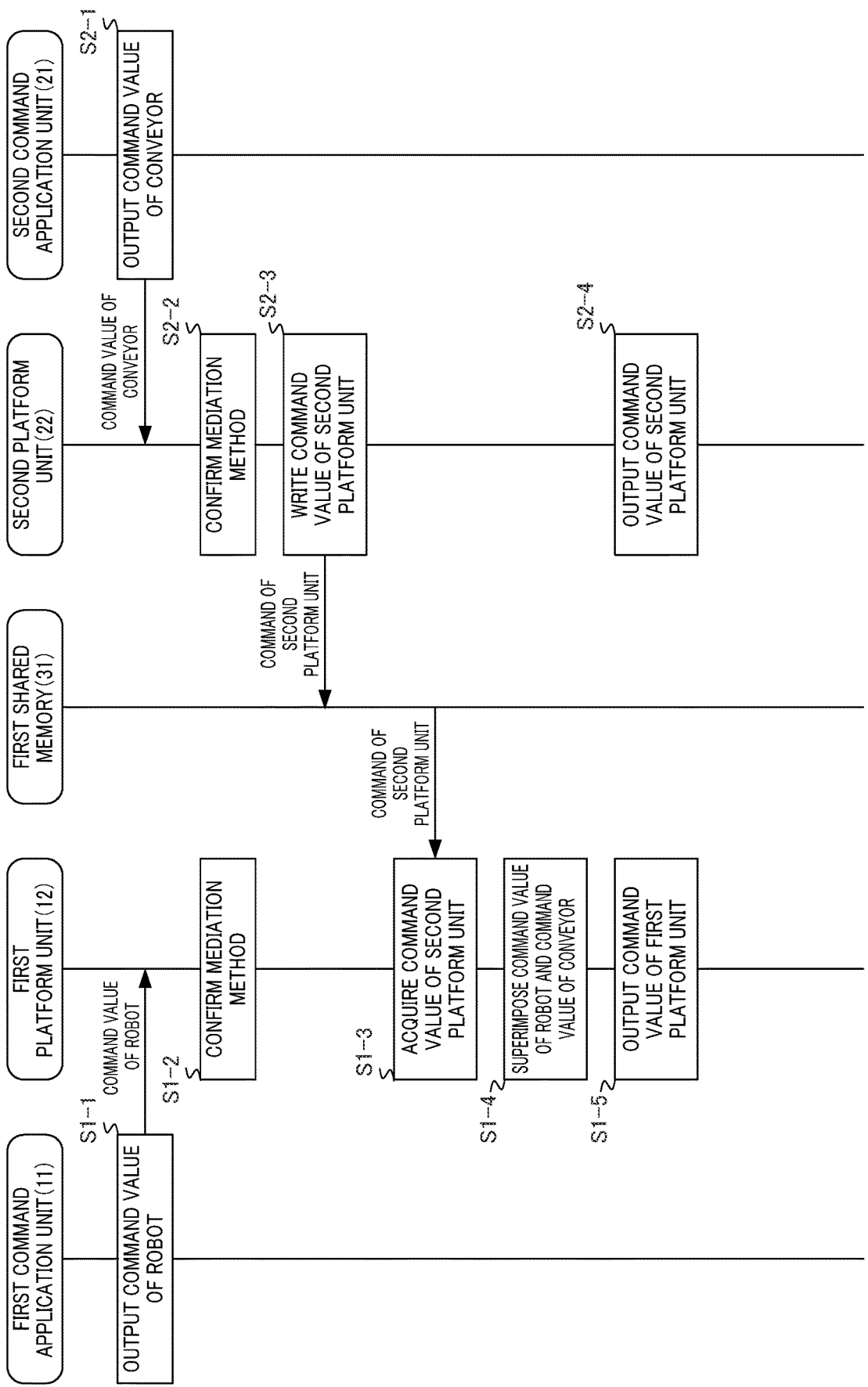
FIG. 5 is a sequence diagram showing an operation of the controller according to the embodiment.

FIG. 5 is a sequence diagram showing an operation of the controller 1 at the time of superimposed control.

In Step S1-1, the first command application unit 11 outputs, to the first platform unit 12, the command value (for example, the motion distance Xr (=40 mm) of the arm 6) of the robot 2.

In Step S1-2, the first platform unit 12 confirms the mediation method between the first platform unit 12 and the second platform unit 22. The mediation method herein is to superimpose the command value (for example, the moving distance Xc (=20 mm) of the conveyor 3) for the conveyor 3 output from the second platform unit 22 on the command value for the robot 2 output from the first platform unit 12.

In Step S2-1, the second command application unit 21 outputs the command value of the conveyor 3 to the second platform unit 22.

In Step S2-2, the second platform unit 22 confirms the mediation method between the second platform unit 22 and the first platform unit 12. The mediation method herein is to superimpose the command value output from the second platform unit 22 on the command value output from the first platform unit 12.

It should be noted that each of Steps S1-1 and S1-2 and Steps S2-1 and S2-2 is executed in parallel as one set, and it does not matter which of the sets is executed first.

In Step S2-3, the second platform unit 22 writes the command value of the conveyor 3 as the command value of the second platform unit 22 in the first shared memory 31.

In Step S1-3, the first platform unit 12 acquires the command value of the conveyor 3 as the command value of the second platform unit 22 from the first shared memory 31.

In Step S1-4, the first platform unit 12 superimposes the command value of the robot 2 and the command value of the conveyor 3.

In Step S1-5, the first platform unit 12 outputs, to the second shared memory 32, the command value of the robot 2 as the command value of the first platform unit 12 and the command value on which the command value of the conveyor 3 is superimposed (added).

In Step S2-4, the second platform unit 22 outputs, to the second shared memory 32, the command value of the conveyor 3 as the command value of the second platform unit 22.

Thus, a production line including the robot 2 and the conveyor 3 is controlled by the controller 1, whereby the superimposition operation between the machines becomes easy and the workpiece can be machined without a stop of the conveyor 3.

3.2 Second Example

Hereinafter, second example will be described with reference to FIGS. 6 to 8. The second example is an example in which one controller performs sequence control between devices having different execution formats (that is, control of an output sequence to the servo control processing unit 40 of movement of the arm of the robot as the "first command value" described above and movement of a slide of press machine as the "second command value").

Figure 6:
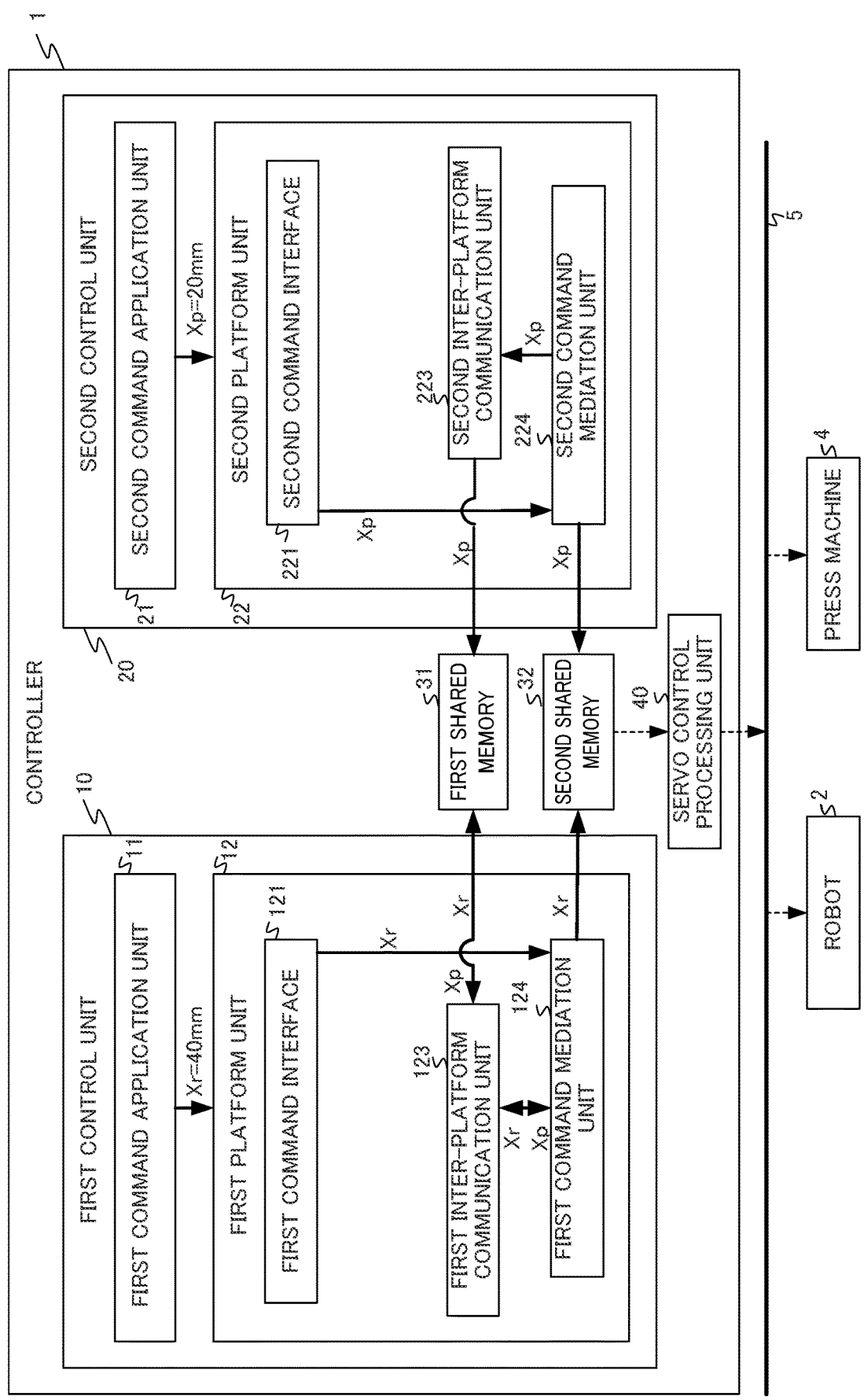
FIG. 6 is a diagram showing a flow of information in the controller according to the embodiment.

FIG. 6 is a diagram showing a flow of information related to the command value in the controller 1 according to the present example. In FIG. 6, some components of the constitution of the controller 1 shown in FIG. 1 will not be provided for simplification of the description.

Figure 7:
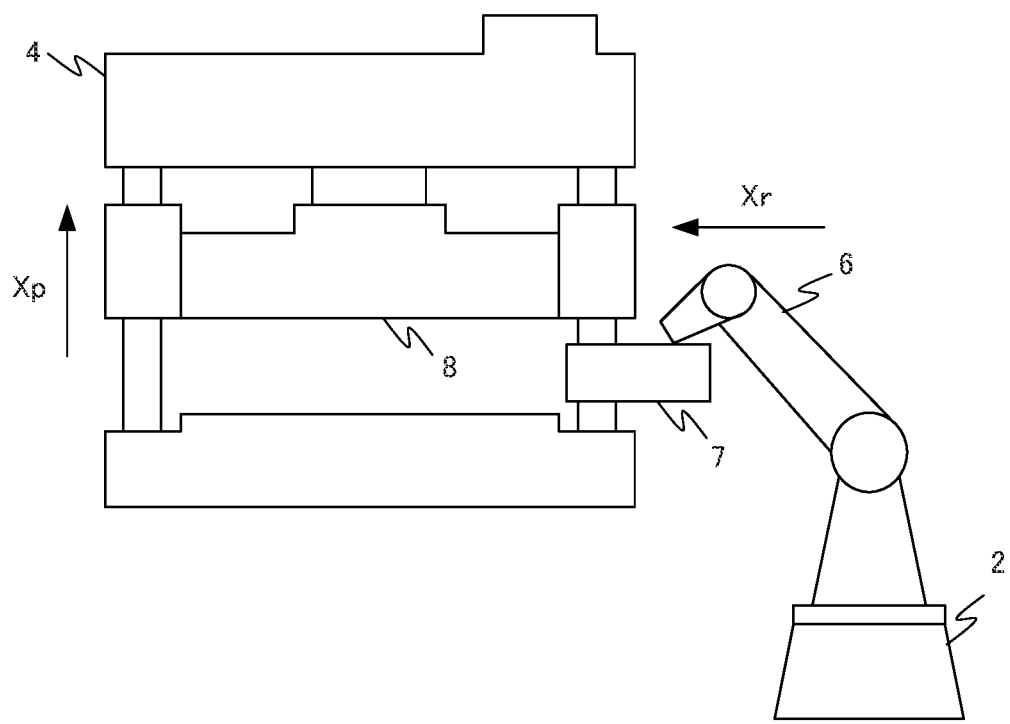
FIG. 7 is a diagram showing an example of a system controlled by the controller according to the embodiment.

Further, FIG. 7 is an overall configuration diagram illustrating a system that executes sequence control belonging to the present example. In the present example, as illustrated in FIG. 7, the robot 2 uses the arm 6 to load the workpiece 7 onto a press machine 4. At this time, in order to improve productivity, after a slide 8 of the press machine 4 moves upward, the arm 6 in the robot 2 loads the workpiece 7 under the slide 8.

In FIG. 6, the command values are transferred along arrows indicated by solid lines. In the example shown in FIG. 6, the controller 1 controls the robot 2 and the press machine 4 via a bus 5. More specifically, the first control unit 10 controls the robot 2, and the second control unit 20 controls the press machine 4. Further, the first command application unit 11 is a robot controller that controls the robot 2 using a robot program as an example. The second command application unit 21 is a numerical controller (CNC) that controls the press machine 4 using an NC program as an example.

The first command application unit 11 outputs, to the first platform unit 12, a motion distance Xr (=40 mm) of the arm 6 of the robot 2 as a command value. Further, the second command application unit 21 outputs, to the second platform unit 22, a moving distance Xp (=20 mm) of the slide 8 of the press machine 4 as a command value. At this time, the first platform unit 12 waits for the processing of the movement command of the press machine 4 from the second platform unit 22, and writes the command value in the second shared memory 32. The command values written in the second shared memory 32 are acquired by the servo control processing unit 40.

Figure 8:
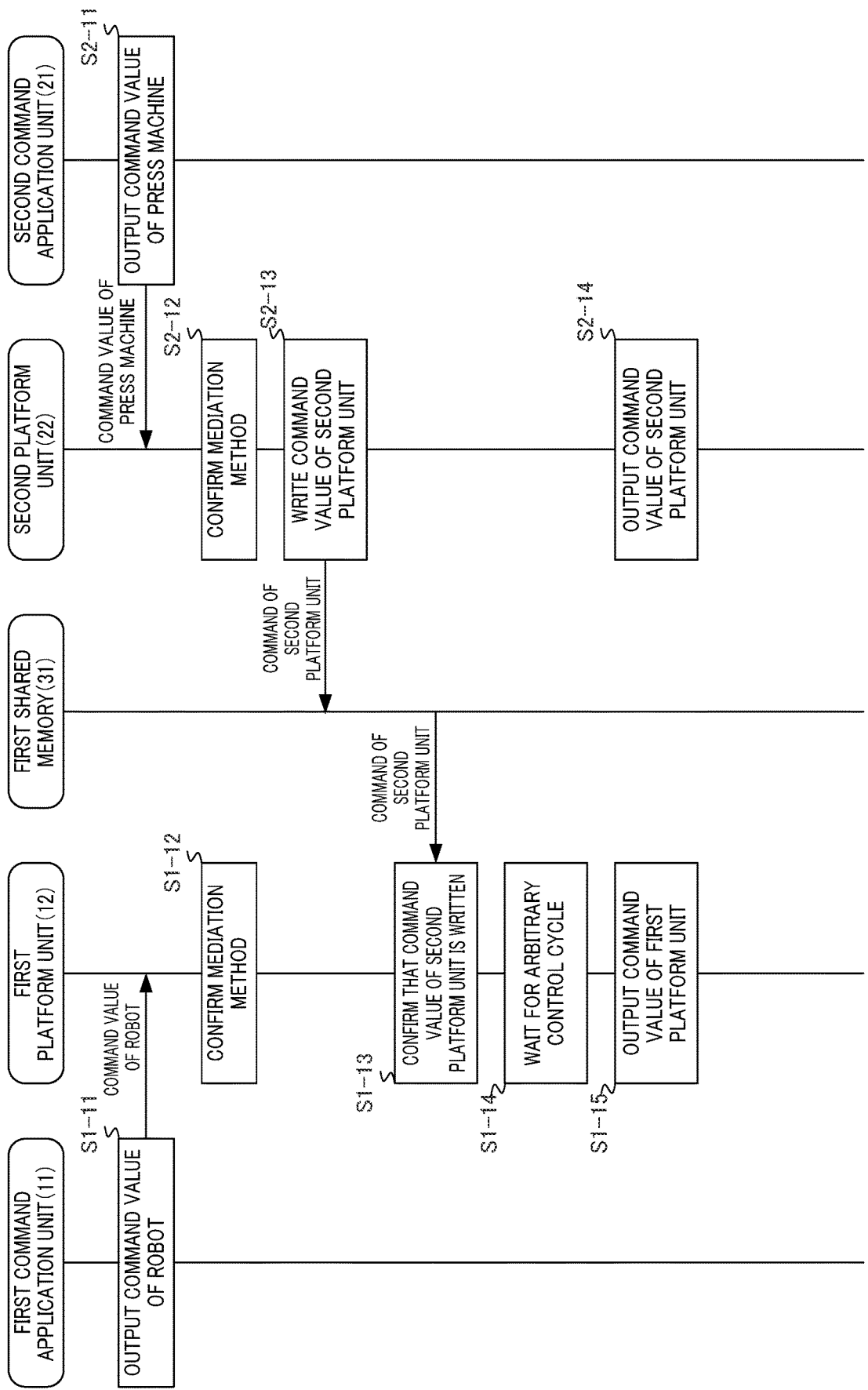
FIG. 8 is a sequence diagram showing an operation of the controller according to the embodiment.

FIG. 8 sequence diagram showing an operation of the controller 1 at the time of sequence control.

In Step S1-11, the first command application unit 11 outputs, to the first platform unit 12, the command value (for example, the motion distance Xr (=40 mm) of the arm 6) of the robot 2.

In Step S1-12, the first platform unit 12 confirms the mediation method between the first platform unit 12 and the second platform unit 22. The mediation method herein is to prioritize the output of the command value (for example, the moving distance Xp (=20 mm) of the slide 8) to the press machine 4 from the second platform unit 22 over the output of the command value to the robot 2 from the first platform unit 12.

In Step S2-11, the second command application unit 21 outputs the command value of the press machine 4 to the second platform unit 22.

In Step S2-12, the second platform unit 22 confirms the mediation method between the second platform unit 22 and the first platform unit 12. The mediation method herein is to prioritize the output of the command value output from the second platform unit 22 over the output of the command value output from the first platform unit 12.

It should be noted that each of Steps S1-11 and S1-12 and Steps S2-11 and S2-12 is executed in parallel as one set, and it does not matter which of the sets is executed first.

In Step S2-13, the second platform unit 22 writes the command value of the press machine 4 as the command value of the second platform unit 22 in the first shared memory 31.

In Step S1-13, the first platform unit 12 confirms that the command value of the press machine 4 is written in the first shared memory 31 from the second platform unit 22.

In Step S1-14, the first platform unit 12 waits for an arbitrary control cycle to elapse.

In Step S1-15, the first platform unit 12 outputs, to the second shared memory 32, the command value of the robot 2 as the command value of the first platform unit 12.

In Step S2-14, the second platform unit 22 outputs, to the second shared memory 32, the command value of the press machine 4 as the command value of the second platform unit 22.

Thus, the first platform unit 12 confirms that the command of the second platform unit 22 is output from the first shared memory 31, and then outputs the command value of the first platform unit 12 to the second shared memory 32 after an arbitrary control cycle.

3.3 Third Example

Hereinafter, a third example will be described with reference to FIG. 9. The third example is an example in which one controller performs synchronization control between devices having different execution formats (that is, control for synchronizing output timings of the "first command value" and the "second command value" described above).

Figure 9:
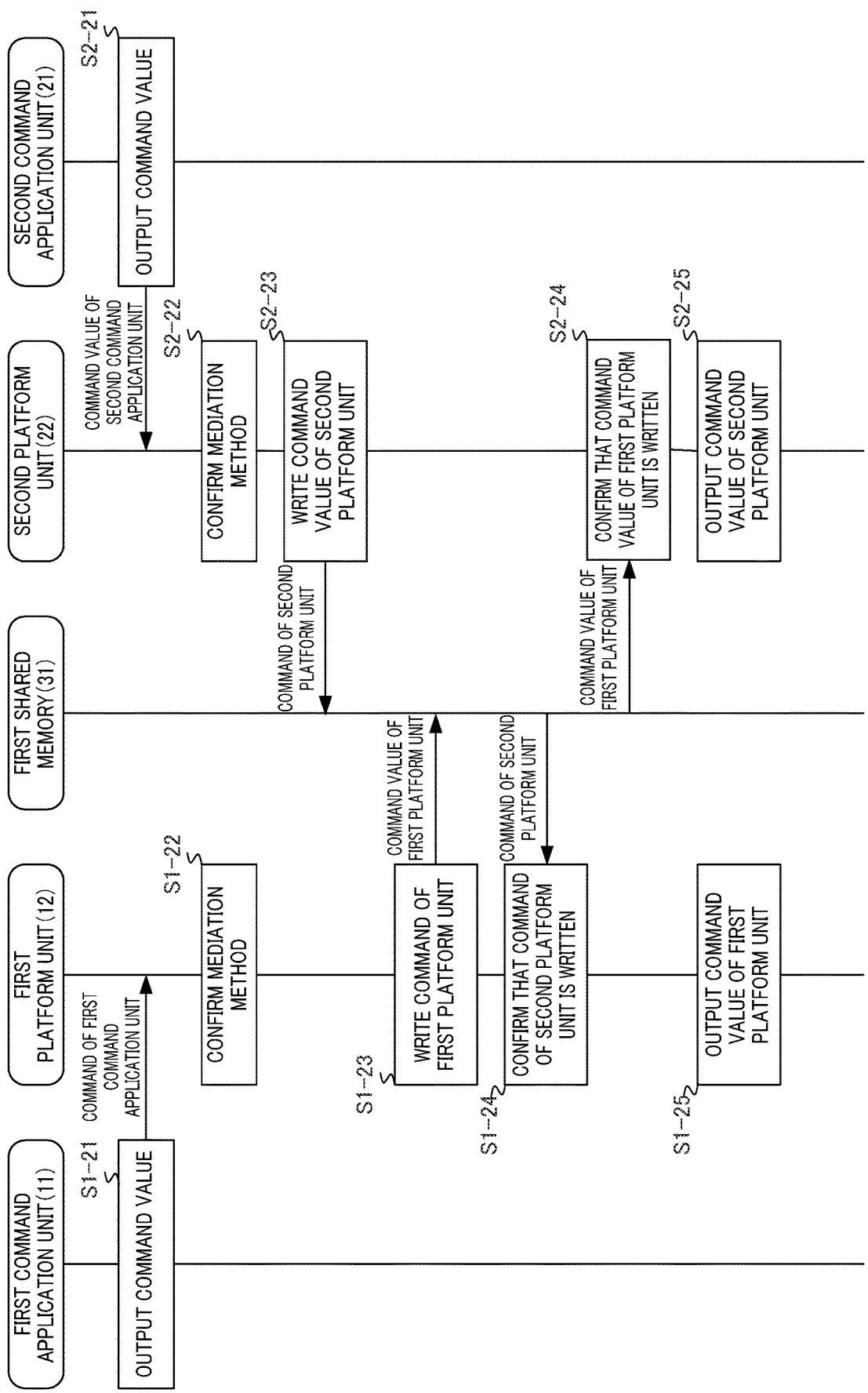
FIG. 9 is a sequence diagram showing an operation of the controller according to the embodiment.

FIG. 9 is a sequence diagram showing an operation of the controller 1 at the time of synchronization control.

In Step S1-21, the first command application unit 11 outputs, to the first platform unit 12, the command value of the first command application unit 11.

In Step S1-22, the first platform unit 12 confirms the mediation method between the first platform unit 12 and the second platform unit 22. The mediation method herein is to synchronize the output of the command value from the first platform unit 12 with the output of the command value from the second platform unit 22.

In Step S2-21, the second command application unit 21 outputs, to the second platform unit 22, the command value from the second command application unit 21.

In Step S2-22, the second platform unit 22 confirms the mediation method between the second platform unit 22 and the first platform unit 12. The mediation method herein is to synchronize the output of the command value from the first platform unit 12 with the output of the command value from the second platform unit 22.

It should be noted that each of Steps S1-21 and S1-22 and Steps S2-21 and S2-22 is executed in parallel as one set, and it does not matter which of the sets is executed first.

In Step S2-23, the second platform unit 22 writes the command value of the second platform unit 22 in the first shared memory 31.

In Step S1-23, the first platform unit 12 writes the command value of the first platform unit 12 in the first shared memory 31.

It does not matter which of Step S1-23 and Step S2-23 is executed first.

In Step S1-24, the first platform unit 12 confirms that the command value is written in the first shared memory 31 from the second platform unit 22.

In Step S2-24, the second platform unit 22 confirms that the command value is written in the first shared memory 31 from the first platform unit 12.

It does not matter which of Step S1-24 and Step S2-24 is executed first.

In Step S1-25, the first platform unit 12 outputs the command value of the first platform unit 12 to the second shared memory 32.

In Step S2-25, the second platform unit 22 outputs the command value of the second platform unit 22 to the second shared memory 32.

Thus, the first platform unit 12 confirms that the second platform unit 22 writes the command value in the first shared memory 31, and outputs the command value of the first platform unit 12 to the second shared memory 32. Further, the second platform unit 22 confirms that the first platform unit 12 writes the command value in the first shared memory 31, and outputs the command value of the second platform unit 22 to the second shared memory 32.

3.4 Fourth Example

Hereinafter, a fourth example will be described with reference to FIG. 10. The fourth example is an example in which one controller performs mixing control between devices having different execution formats (that is, control for outputting the command value from the second platform unit 22 as the "first command value" and outputting the command value from the first platform unit 12 as the "second command value").

FIG. 10 is a sequence diagram showing an operation of the controller 1 at the time of mixing control.

In Step S1-31, the first command application unit 11 outputs, to the first platform unit 12, the command value of the first command application unit 11.

In Step S1-32, the first platform unit 12 confirms the mediation method between the first platform unit 12 and the second platform unit 22. The mediation method herein is that the first platform unit 12 outputs the command value of the second platform unit 22 and the second platform unit 22 outputs the command value of the first platform unit 12.

In Step S2-31, the second command application unit 21 outputs, to the second platform unit 22, the command value from the second command application unit 21.

In Step S2-32, the second platform unit 22 confirms the mediation method between the second platform unit 22 and the first platform unit 12. The mediation method herein is that the first platform unit 12 outputs the command value of the second platform unit 22 and the second platform unit 22 outputs the command value of the first platform unit 12.

It should be noted that each of Steps S1-31 and S1-32 and Steps S2-31 and S2-32 is executed in parallel as one set, and it does not matter which of the sets is executed first.

In Step S2-33, the second platform unit 22 writes the command value of the second platform unit 22 in the first shared memory 31.

In Step S1-33, the first platform unit 12 writes the command value of the first platform unit 12 in the first shared memory 31.

It does not matter which of Steps S1-33 and Step S2-33 is executed first.

In Step S1-34, the first platform unit 12 acquires the command value of the second platform unit 22 from the first shared memory 31.

In Step S2-34, the second platform unit 22 acquires the command value of the first platform unit 12 from the first shared memory 31.

It does not matter which of Step S1-34 and Step S2-34 is executed first.

In Step S1-35, the first platform unit 12 outputs the command value of the second platform unit 22 to the second shared memory 32.

In Step S2-35, the second platform unit 22 outputs the command value of the first platform unit 12 to the second shared memory 32.

Thus, the first platform unit 12 confirms that the second platform unit 22 writes the command value in the first shared memory 31, and outputs the command value of the second platform unit 22 to the second shared memory 32. Further, the second platform unit 22 confirms that the first platform unit 12 writes the command value in the first shared memory 31, and outputs the command value of the first platform unit 12 to the second shared memory 32.

4. Effects (1) The present embodiment provides the controller (for example, the "controller 1" described above) including the plurality of platforms, the controller including: the plurality of command application units (for example, the "first command application unit 11" and the "second command application unit 21" described above); the plurality of platform units (for example, the "first platform unit 12" and the "second platform unit 22" described above) that are associated with the plurality of command application units, respectively; the shared memory (for example, the "first shared memory 31" and the "second shared memory 32" described above) that stores information communicated between the plurality of platforms; and the servo control processing unit (for example, the "servo control processing unit 40" described above), the command application units including: the command processing unit (for example, the "first command processing unit 112" and the "second command processing unit 212" described above) that outputs command values; and the mediation method designating unit (for example, the "first mediation method designating unit 111" and the "second mediation method designating unit 211" described above; that outputs the mediation method classification and the identification information of the platform units subject to coordinated control, the platform units including: the first interface unit (for example, the "first command interface 121" and the "second command interface 221" described above) that acquires the command value from the command application units; the second interface unit (for example, the "first mediation method designating interface 122" and the "second mediation method designating interface 222" described above) that acquires the mediation method classification and the identification information of the platform units from the command application units; the inter-platform communication unit (for example, the "first inter-platform communication unit 123" and the "second inter-platform communication unit 223" described above) that transfers the command value, the identification information, and the mediation method classification between the platform units via the shared memory; and the command mediation unit (for example, the "first command mediation unit 124" and the "second command mediation unit 224" described above) that acquires the command value, the identification information, and the mediation method classification from all the platform units subject to coordinated control, mediates the command value based on the identification information and the mediation method classification, and outputs the mediated command value to the shared memory, the servo control processing unit being configured to perform servo control based on the mediated command value acquired from the shared memory.

Thus, each platform in one controller performs mediation of the operation timing between devices, which has been performed by the application in each controller, and thus the application in each controller can cause the to-be-controlled device to operate without being conscious of the operation timing.

(2) In the controller described in (1) above, the mediation method classification includes any one selected frog sequence control, synchronization, mixing, and superimposition of the command values between the plurality of platform units.

Thus, the sequence control, the synchronization, the mixing, and the superimposition between the devices can be easily performed, and the coordinated operation can be smoothly performed between the devices.

5. Modification Example

The controller 1 according to the above-described embodiment includes two control units, that is, the first control unit 10 and the second control unit 20, but is not limited thereto. For example, an arbitrary plurality of control units can be provided according to the number of devices to be controlled by the controller 1.

Each component included in the controller 1 described above can be implemented by hardware, software, or a combination thereof. A control method performed by cooperation of each component included in the controller 1 described above can also be implemented by hardware, software, or a combination thereof. Implementation by software herein means that the control method is implemented by a computer which reads and executes a program.

The program can be stored on any of a various types of non-transitory computer-readable media and can be provided to a computer. The non-transitory computer-readable media include various types of tangible storage media. Examples of non-transitory computer-readable media include magnetic storage media (such as flexible disks, magnetic tapes, hard disk drives, etc.), optical magnetic storage media (for example, magneto-optical disks), a CD-ROM (Read Only Memory), CD-R, CD-R/W, and semiconductor memories (such as a mask ROM, a PROM (Programmable ROM), an EPROM (Erasable PROM), a flash ROM, and a RAM (random access memory)). The program may be provided using any of various types of transitory computer readable media to a computer. Examples of transitory computer readable media include electric signals, optical signals, and electromagnetic waves. Transitory computer readable media can provide the program to a computer via a wired communication line such as an electric wire or an optical fiber, or a wireless communication line.

EXPLANATION OF REFERENCE NUMERALS 1 controller
10 first control unit
11 first command application unit
12 first platform unit
20 second control unit
21 second command application unit
22 second platform unit
31 first shared memory
32 second shared memory
40 servo control processing unit
111 first mediation method designating unit
122 first mediation method designating interface
123 first inter-platform communication unit
124 first command mediation unit
211 second mediation method designating unit
222 second mediation method designating interface
223 second inter-platform communication unit
224 second command mediation unit

The invention claimed is:

1. A controller including a plurality of platforms, the controller comprising:
a plurality of command application units;
a plurality of platform units that are associated with the plurality of command application units, respectively, each of the plurality of command application units is part of a respective control unit of a plurality of control units, each of the plurality of control units respectively controlling one or more devices of a plurality of devices that are different from each other;
a shared memory that stores information communicated between the plurality of platform units; and
a servo control processing unit,
each of the command application units including:
a command processing unit that outputs a command value; and
a command mediation method designating unit that outputs a mediation method classification and identification information of the platform units subject to coordinated control,
each of the platform units including:
a first interface unit that acquires the command value from the command application unit associated with that platform unit, the command value being for the device controlled by the control unit of which the command application unit associated with that platform unit is a part;
a second interface unit that acquires the mediation method classification and the identification information of the platform units from the command application unit associated with that platform unit, the mediation method classification indicating a mediation method of mediating as a coordinated operation of command values between the command value for the device and a different command value for a different device that is controlled by another control unit of the plurality of control units;
an inter-platform communication unit that transfers the command value, the identification information, and the mediation method classification between the platform units via the shared memory; and
a command mediation unit that acquires the command value, the identification information, and the mediation method classification from all the platform units subject to coordinated control, mediates the command value based on the identification information and the mediation method classification, and outputs the mediated command value to the shared memory,
the servo control processing unit being configured to perform servo control based on the mediated command value acquired from the shared memory,
wherein the mediated command value is obtained from mediation of operation timing performed by each of the plurality of platforms in the controller between the plurality of devices as a coordinated operation of commands executed by different applications for the plurality of devices which require a coordinated operation.

2. The controller according to claim 1, wherein the mediation method classification includes any one selected from sequence control, synchronization, mixing, and superimposition of the command values between the plurality of platform units.

* * * * *